United States Patent
Yun et al.

(10) Patent No.: US 10,372,333 B2
(45) Date of Patent: Aug. 6, 2019

(54) ELECTRONIC DEVICE AND METHOD FOR STORING A FILE IN A PLURALITY OF MEMORIES

(71) Applicant: Samsung Electronics Co., Ltd., Suwon-si, Gyeonggi-do (KR)

(72) Inventors: Sung Hwan Yun, Suwon-si (KR); Sei Jin Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 14/734,351

(22) Filed: Jun. 9, 2015

(65) Prior Publication Data
US 2015/0363112 A1 Dec. 17, 2015

(30) Foreign Application Priority Data
Jun. 11, 2014 (KR) ........................ 10-2014-0070929

(51) Int. Cl.
*G06F 3/06* (2006.01)

(52) U.S. Cl.
CPC ............ *G06F 3/0608* (2013.01); *G06F 3/061* (2013.01); *G06F 3/0643* (2013.01); *G06F 3/0683* (2013.01); *G06F 3/0685* (2013.01)

(58) Field of Classification Search
CPC .... G06F 3/0608; G06F 3/0683; G06F 3/0685; G06F 3/0643; G06F 3/061
See application file for complete search history.

(56) References Cited

U.S. PATENT DOCUMENTS

| | | | |
|---|---|---|---|
| 8,335,807 B1* | 12/2012 | Cerda, Jr. | G06F 17/30194 707/821 |
| 8,601,169 B1 | 12/2013 | Paragaonkar et al. | |
| 8,745,675 B2* | 6/2014 | Hodzic | H04N 21/23109 725/100 |
| 8,782,295 B2 | 7/2014 | Paragaonkar et al. | |
| 2003/0149750 A1* | 8/2003 | Franzenburg | G06F 3/0608 709/220 |
| 2006/0206889 A1* | 9/2006 | Ganesan | H04N 7/17318 717/169 |
| 2007/0061544 A1 | 3/2007 | Uppala | |
| 2007/0140140 A1* | 6/2007 | Feeley | H04L 29/06027 370/252 |
| 2009/0025048 A1* | 1/2009 | Ganesan | G06F 17/30017 725/92 |
| 2009/0157948 A1* | 6/2009 | Trichina | G06F 12/0246 711/103 |

(Continued)

FOREIGN PATENT DOCUMENTS

| | | |
|---|---|---|
| GB | 2 413 410 A | 10/2005 |
| JP | 2012-138144 A | 7/2012 |

(Continued)

Primary Examiner — Arpan P. Savla
(74) Attorney, Agent, or Firm — Jefferson IP Law, LLP

(57) ABSTRACT

An electronic device is provided. The electronic device includes a first memory, a second memory, and a control module configured, when a file storing event occurs, to divide a file inputted from outside of the electronic device into a plurality of files, to store a portion of the divided files in the first memory, and to store another portion of the divided files in the second memory, wherein one of the first memory and the second memory includes a header notifying a storage location of the divided files.

18 Claims, 7 Drawing Sheets

(56) References Cited

U.S. PATENT DOCUMENTS

| | | | |
|---|---|---|---|
| 2010/0017565 A1 | 1/2010 | Kwon et al. | |
| 2010/0205329 A1* | 8/2010 | Ukai | G06F 3/061 |
| | | | 710/33 |
| 2010/0228800 A1 | 9/2010 | Aston et al. | |
| 2010/0241757 A1* | 9/2010 | Hu | H04L 29/08729 |
| | | | 709/231 |
| 2011/0153606 A1 | 6/2011 | Kim et al. | |
| 2011/0202733 A1* | 8/2011 | Wright | G06F 3/0608 |
| | | | 711/154 |
| 2013/0124585 A1 | 5/2013 | Suzuki et al. | |
| 2013/0151761 A1 | 6/2013 | Kim et al. | |
| 2013/0263190 A1* | 10/2013 | Aravindakshan | H04N 21/6181 |
| | | | 725/62 |
| 2014/0052706 A1* | 2/2014 | Misra | G06F 17/30194 |
| | | | 707/698 |
| 2014/0089990 A1* | 3/2014 | van Deventer | H04N 21/218 |
| | | | 725/61 |
| 2014/0095737 A1 | 4/2014 | Paragaonkar et al. | |
| 2016/0371190 A1* | 12/2016 | Romanovskiy | G06F 3/067 |

FOREIGN PATENT DOCUMENTS

| | | |
|---|---|---|
| JP | 2013-80409 A | 5/2013 |
| WO | 2010/102180 A1 | 9/2010 |

\* cited by examiner

ELECTRONIC DEVICE AND METHOD FOR STORING A FILE IN A PLURALITY OF MEMORIES

CROSS-REFERENCE TO RELATED APPLICATION(S)

This application claims the benefit under 35 U.S.C. § 119(a) of a Korean patent application filed on Jun. 11, 2014 in the Korean Intellectual Property Office and assigned Serial number 10-2014-0070929, the entire disclosure of which is hereby incorporated by reference.

TECHNICAL FIELD

The present disclosure relates to an electronic device for storing a file in a memory and a file storing method thereof.

BACKGROUND

With the development of electronic technology, various multimedia files such as picture files, video files, and music files are emerging and with the development of technology, the sizes and capacities of such multimedia files are increasing. Accordingly, technology relating to a storage device for recording files has evolved as well.

As a storage device for storing files, an optical disk drive (ODD) and a hard disk drive (HDD) were used in the past but recently, various types of storage, such as a secure digital (SD) card, a micro SD card, a multimedia card (MMC), an embedded MMC (eMMC), a Universal Flash Storage (UFS), a UFS card, a compact flash (CF) card, and a memory stick are under development.

Technical development for improving a processing speed of a memory for recording large files as well as a storage capacity of the memory have been continuing.

In general, since one multimedia file is written in one storage device, a time consumed for recording a large multimedia file in a storage device may depend on the processing speed of the storage device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device capable of improving a file writing speed by writing a multimedia file in a plurality of storage devices simultaneously and a file storing method thereof.

In accordance with an aspect of the present disclosure, an electronic device is provided. The electronic device includes a first memory, a second memory, and a control module configured, when a file storing event occurs, to divide a file inputted from outside the electronic device into a plurality of files, to store a portion of the divided files in the first memory, and to store another portion of the divided files in the second memory, wherein one of the first memory and the second memory includes a header notifying a storage location of the divided files.

In accordance with another aspect of the present disclosure, a method of file storing performed by an electronic device is provided. The method includes dividing, by a control module of the electronic device, a file inputted from outside the electronic device into a plurality of files, when a file storing event occurs, storing a portion of the divided files in a first memory, storing another portion of the divided files in a second memory, and storing a header indicating a storage location of the divided files in one of the first memory and the second memory.

In accordance with another aspect of the present disclosure, a non-transitory computer-readable storage medium storing instructions that, when executed, cause at least one processor to perform a method of file storing method is provided. The method includes dividing a file inputted from outside of an electronic device into a plurality of files when a file storing event occurs, storing a portion of the divided files in a first memory, storing another portion of the remaining divided files in a second memory, and storing a header indicating a storage location of the divided files in the first memory or the second memory.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
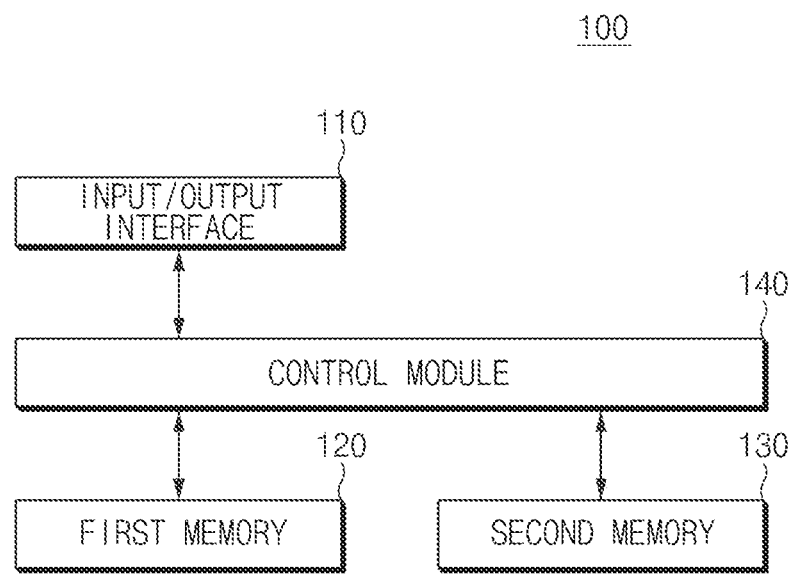
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "have," "may include," "may comprise" and/or "may have" used herein indicate disclosed functions, operations, and/or an existence of elements but do not exclude other functions, operations and/or elements. Additionally, in various embodiments of the present disclosure, the terms "include," "comprise," "including," and/or "comprising," specify a property, a region, a fixed number, an operation, a process, an element and/or a component but do not exclude other properties, regions, fixed numbers, operations, processes, elements and/or components.

In various embodiments of the present disclosure, expression "A or B" and/or "at least one of A or/and B" may include all possible combinations of items listed together. For instance, the expression "A or B," and/or "at least one of A or/and B" may indicate include A, B, or both A and B.

The terms such as "$1^{st}$," "$2^{nd}$," "first," "second," and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure.

Unless otherwise indicated herein, all the terms used herein, which include technical or scientific terms, may have the same meaning that is generally understood by a person skilled in the art.

In general, the terms defined in the dictionary should be considered to have the same meaning as the contextual meaning of the related art, and, unless clearly defined herein, should not be understood abnormally or as having an excessively formal meaning.

Additionally, an electronic device according to various embodiments of the present disclosure may be a device with a file storing function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), Moving Picture Experts Group Audio Layer 3 (MP3)) players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to various embodiments of the present disclosure, an electronic device may be a smart home appliance having a file storing function. The smart home appliance may include at least one of, for example, a television (TV), a digital video disc (DVD) player, an audio player, a refrigerator, an air conditioner, a cleaner, an oven, a microwave oven, a washing machine, an air cleaner, a set-top box, a TV box (for example, Samsung HomeSync™, Apple TV™ or Google TV™), a game console, an electronic dictionary, an electronic key, a camcorder, and an electronic picture frame.

According to various embodiments of the present disclosure, an electronic device may include at least one of various medical devices (for example, a magnetic resonance angiography (MRA) device, a magnetic resonance imaging (MRI) device, a computed tomography (CT) device, a medical imaging device, an ultrasonic device, etc.) a navigation device, a global positioning system (GPS) receiver, an event data recorder (EDR), a flight data recorder (FDR), a vehicle infotainment device, a marine electronic equipment (for example, a marine navigation system, a gyro compass, etc.), avionics, security equipment, a vehicle head module, an industrial or household robot, a financial institutions' automatic teller machine (ATM), and a stores' point of sale (POS) device.

According to various embodiments of the present disclosure, an electronic device may include at least one of furniture or building/structure having a file storing function, an electronic board, an electronic signature receiving device, a projector, and a measuring instrument (for example, a water measuring instrument, an electricity measuring instrument, a gas measuring instrument, and/or a radio signal measuring instrument). An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

Hereinafter, an electronic device according to various embodiments of the present disclosure will be described in more detail with reference to the accompanying drawings. The term "user" in various embodiments of the present disclosure may refer to a person using an electronic device or a device using an electronic device (for example, an artificial intelligent electronic device).

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a configuration of an electronic device according to an embodiment of the present disclosure.

Referring to FIG. 1, an electronic device 100 is illustrated, where the electronic device 100 may include an input/output interface 110, a first memory 120, a second memory 130, and a control module 140.

The input/output interface 100 may receive a file from the outside (for example, an external electronic device or a network). According to an embodiment of the present disclosure, the input/output interface 110 may be implemented with a WiFi module, a near field communication (NFC) module, a cellular module, a Bluetooth (BT) module, and/or a radio frequency (RF) module. According to an embodiment of the present disclosure, the input/output interface 110 may be implemented with an interface module such as a high-definition multimedia interface (HDMI), a universal serial bus (USB), a D-subminiature (D-sub), and/or an optical interface.

According to an embodiment of the present disclosure, the input/output interface 110 may output a file stored in the first memory 120 and/or the second memory 130 to the outside.

The first memory 120 and the second memory 130 may store files inputted to the input/output interface 110. Although it is shown in FIG. 1 that the electronic device 100 includes two memories, this is just one embodiment of the present disclosure and thus, the electronic device 100 may include at least two (for example, three) memories.

According to an embodiment of the present disclosure, the first memory 120 or the second memory 130 may be implemented in a form of being built in the electronic device 100. According to an embodiment of the present disclosure, the first memory 120 or the second memory 130 may be implemented in a form of being detachable from the electronic device 100. For example, the first memory 120 may be a built-in memory and the second memory 130 may be a detachable external memory. According to an embodiment of the present disclosure, the first memory 120 or the second memory 130 may be implemented with a universal flash storage (UFS) (for example, an internal type) or a UFS card (for example, an external type).

According to an embodiment of the present disclosure, the first memory 120 or the second memory 130 may include a data area where data is stored and a metadata area including information regarding the stored data. Metadata may include information regarding an address of data stored in a memory and a data structure. According to an embodiment of the present disclosure, a header including storage location information of a separated file may be stored in a data area of a memory.

According to an embodiment of the present disclosure, the first memory 120 or the second memory 130 may store a file by a chunk unit. For example, files stored in the first memory 120 or the second memory 130 may be divided by a plurality of chunks (or blocks) and then stored. The chunk (or block) is a unit for managing data in the electronic device 100 or the memory 120 or 130 and may have a random size.

The control module 140 may control overall operations of the electronic device 100. For example, the control module 140 may distribute and store files in the first memory 120 and the second memory 130 by controlling each of the input/output interface 110, the first memory 120, and the second memory 130 according to various embodiments of the present disclosure.

According to an embodiment of the present disclosure, when a file storing event occurs, the control module 140 may divide a file inputted to the input/output interface 110 into a plurality of files. The file storing event, for example, may be an event of a user's file storing instruction or a multimedia file reception from the outside.

According to an embodiment of the present disclosure, the control module 140 may perform a control to store some of the divided files in the first memory 120 and store some of the remaining in the second memory 130.

According to an embodiment of the present disclosure, the sizes of the divided files stored in the first memory 120 and the second memory 130 may be determined according to an additional (or, separate) read or write operation (or, an I/O situation) currently performed in the first memory 120 and the second memory 130. For example, when an additional read or write operation being currently performed in the second memory 130 is more, as compared to the first memory 120, the size of a file stored in the first memory 120 may be greater than the size of a file stored in the second memory 130.

According to an embodiment of the present disclosure, an operation of the first memory 120 to store a file and an operation of the second memory 130 to store a file may occur at the same time. For example, when a file storing event occurs, the control module 140 may generate a file storing command for the first memory 120 and the second memory 130 simultaneously.

Accordingly, as one file is stored in the first memory 120 and the second memory 130 simultaneously, a file storing speed can be improved. For example, when a file storing speed of each of the first memory 120 and the second memory 130 is 20 megabyte per second (Mbyte/sec), in a case that the first memory 120 and the second memory 130 store one file at the same time, a speed of up to 40 Mbyte/sec can be obtained.

According to an embodiment of the present disclosure, the control module 140 may determine the size of a file stored in the memory 120 and the second memory 130 according to an additional read or write operation currently performed in the first memory 120 and the second memory 130. For example, while a read operation on another file stored in the second memory 130 is performed, the control module 140 may perform a control to store a relatively larger amount of files in the first memory 120 in comparison to the second memory 130.

According to an embodiment of the present disclosure, the control module 140 may insert into metadata a flag that indicates that a file is distributed and stored in a plurality of memories.

According to an embodiment of the present disclosure, the control module may store in the first memory 120 or the second memory 130 a header that notifies a storage location of a divided file. According to an embodiment of the present disclosure, the header may include information regarding a memory that stores a chunk (or block) (for example, the first memory 120 or the second memory 130), information regarding a location that a chunk corresponds in an entire file, and information regarding the size of a chunk.

Figure 2:
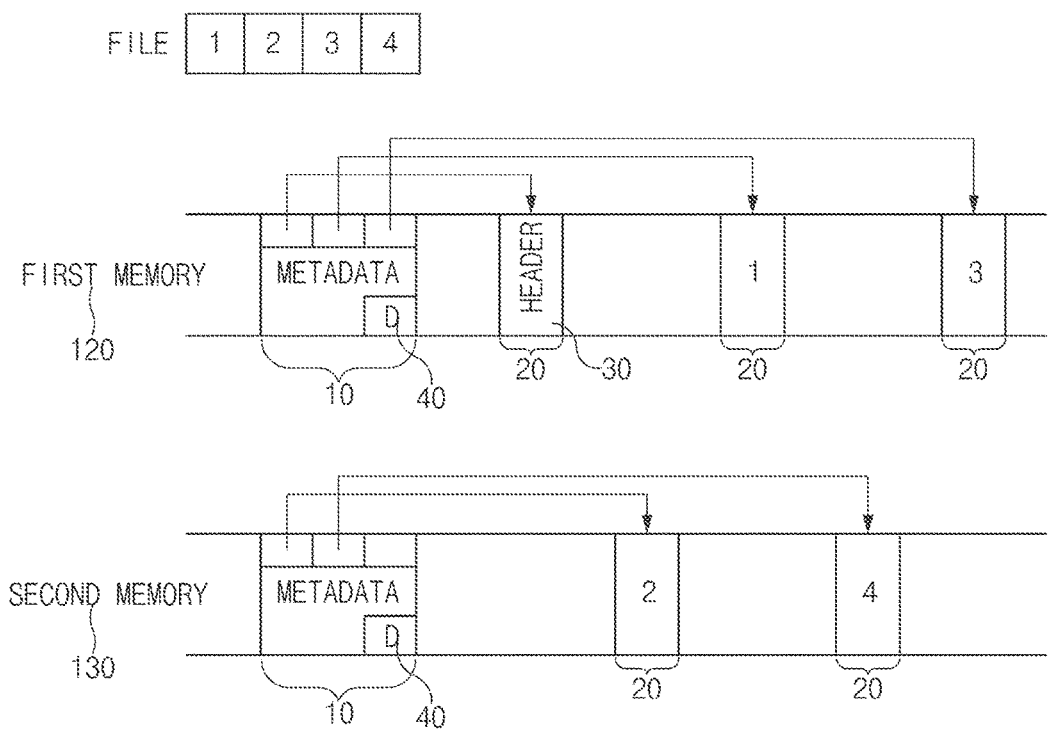
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an illustration is provided where one file is divided into two files and stored in two memories. As mentioned above, when a divided file is stored in a memory, it may be divided and stored by a chunk (or block) unit and the size of a chunk may be identical to or different from each other.

Referring to FIG. 2, one of two divided files may include a first chunk and a third chunk and the other one may include a second chunk and a fourth chunk. The first and third chunks may be stored in a first memory 120 and the second and fourth chunks may be stored in a second memory 130. The first memory 120 and the second memory 130 may include a metadata area 10 storing metadata and a data area 20 storing a divided file.

The first memory 120 may store a header 30 in addition to the first chunk and the third chunk. According to an embodiment of the present disclosure, a header may be stored in at least one among a plurality of memories storing a file. For example, a header may be stored only in the first memory 120 as shown in FIG. 2 or may be stored in both the first memory 120 and the second memory 130.

According to an embodiment of the present disclosure, the header 30 may be stored in at least one among a plurality of memories storing a file. When the header 30 is stored in the data area 20, the first memory 120 may recognize the header 30 as one kind of data.

According to an embodiment of the present disclosure, a header may include information regarding a file (or a divided file). For example, a header may include information regarding a divided file by a chunk unit. Table 1 represents information included in a header in a table form according to an embodiment of the present disclosure. Table 1 represents that the total size of a file is 2 Mbyte and the file is divided into two files each having the size of 1 Mbyte.

TABLE 1

|   | Offset1   | device | Offset2   | size      |
|---|-----------|--------|-----------|-----------|
| 1 | 0         | D1     | 512 Kbyte | 512 Kbyte |
| 2 | 512 Kbyte | D2     | 0         | 512 Kbyte |
| 3 | 1 Mbyte   | D1     | 1 Mbyte   | 512 Kbyte |
| 4 | 1.5 Mbyte | D2     | 512 Kbyte | 512 Kbyte |

Referring to Table 1, information regarding offset1, device, offset2, and size may be included. Offset1 indicates a start location of a chunk in an entire file. Device indicates a memory where a chunk is stored. Offset2 indicates a start location of a chunk in a divided file stored in a specific memory. Size indicates a data size of a divided chunk.

Referring to Table 1, the first chunk is a chunk corresponding to 0 Kbyte to 512 Kbyte in the entire file of 2 Mbyte and stored in the first memory D1 and also is a chunk corresponding to 512 Kbyte to 1 Mbyte in a file stored in the first memory D1 (a header corresponds to 0 Kbyte to 512 Kbyte) and having a size of 512 Kbyte. The second chunk is a chunk corresponding to 512 Kbyte to 1 Mbyte in the entire file and stored in the second memory D2 and also is a chunk corresponding to 0 Kbyte to 512 Kbyte in a file stored in the second memory D2 and having a size of 512 Kbyte. The third chunk is a chunk corresponding to 1 Mbyte to 1.5 Mbyte in the entire file and stored in the first memory D1 and also is a chunk corresponding to 1 Kbyte to 1.5 Mbyte in a file stored in the first memory D1 and having a size of 512 Kbyte. The fourth chunk is a chunk corresponding to 1.5 Kbyte to 2 Mbyte in the entire file and stored in the second memory D2 and also is a chunk corresponding to 512 Kbyte to 1 Mbyte in a file stored in the second memory D2 and having a size of 512 Kbyte.

Referring to FIG. 2, each of the first memory 120 and the second memory 130 may include metadata 10 indicating the storage location (or address) of a divided file. According to an embodiment of the present disclosure, the metadata may include information regarding the storage location of a file by a chunk (or block unit). When the header 30 is stored in the first memory 120, metadata of the first memory 120 may include information indicating the storage location of the header 30.

According to an embodiment of the present disclosure, the metadata may include a flag indicating that a corresponding file is a file distributed and stored in a plurality of memories. For example, referring to FIG. 2, each of the first memory 120 and the second memory 130 may include a distribution file flag 40 in the metadata 10.

According to an embodiment of the present disclosure, the control module 140 may integrate files distributed and stored in a plurality of memories. According to an embodiment of the present disclosure, when a read instruction on a file occurs, the control module 140 may check whether there is a distribution file flag 40 by accessing the metadata 10 of a corresponding file. If there is a distribution file flag 40, then the storage location of the distribution file may be checked by checking the header 30 of a corresponding file. When the storage location of the distribution file is checked, the control module 140 may read each file from a plurality of memories storing files. Then, a corresponding file may be integrated by using information included in the header 30. The integrated file may be played a file playback application or may be transmitted to another electronic device or a network through the input/output interface 110.

Figure 3:
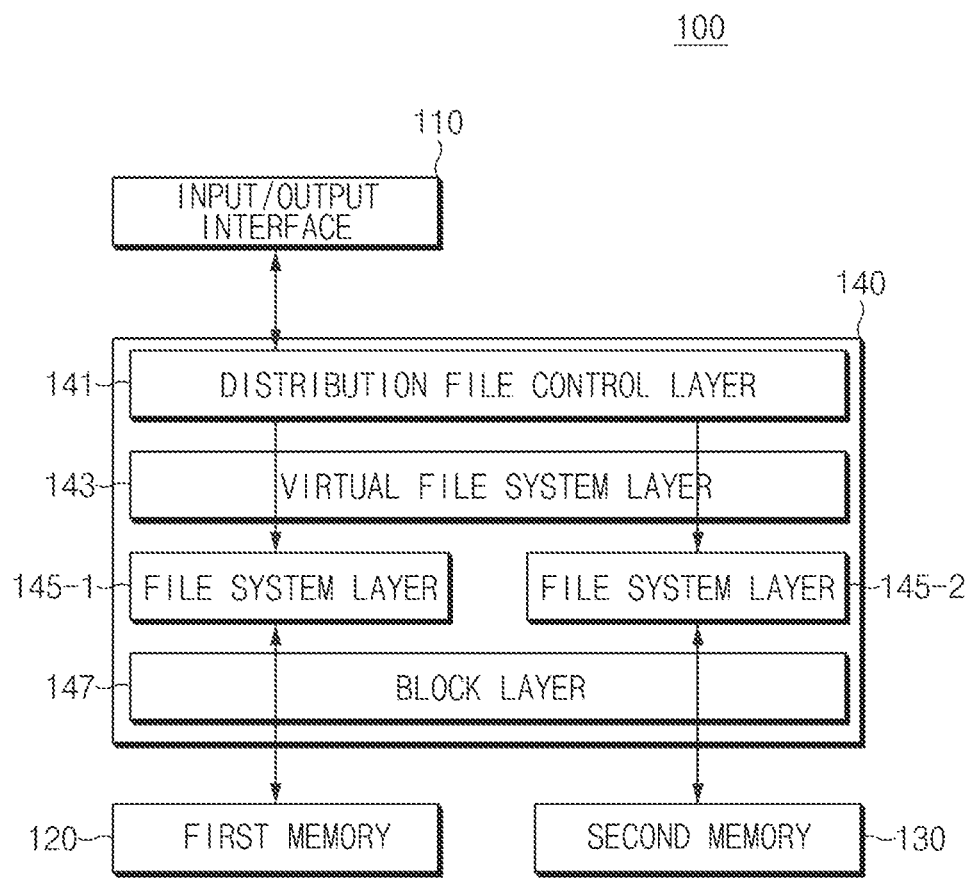
FIG. 3 is a view illustrating a software layer of a control module according to an embodiment of the present disclosure.

FIG. 3 is a view illustrating a software layer of a control module according to an embodiment of the present disclosure.

Referring to FIG. 3, an electronic device 100 is illustrated, where the electronic device 100 may include an input/output interface 110, a first memory 120, a second memory 130 and a control module 140, where the control module 140 may include a distribution file control layer 141, a virtual file system (VFS) layer 143, file system layers (e.g., file system layer 145-1 and file system layer 145-2), and a block layer 147.

The distribution file control layer 141 may divide a file inputted to the input/output interface 110 into a plurality of files. For example, when a user application (for example, a file storage application) calls an open, read, write, or close instruction with respect to one file inputted through the input/output interface 110 (for example, an application programming interface (API) or a file input/output function), the distribution file control layer 141 divides a file into a plurality of files (with respect to a plurality of file systems) to call a plurality of open, read, write, or close instructions. That is, a user application may use an existing file access implementation as it is without modification.

The VFS layer 143, as an upper layer of the file system layer 145, allows an application to access several file systems. The VFS layer 143 may generate a command such as open, read, write, or close to the file system layers 145-1 and/or 145-2. According to an embodiment of the present disclosure, the VFS layer 143 may generate one open command, a plurality of write commands, and one close command in order to store one file (or a divided file). For example, the VFS layer 143 may generate a plurality of write commands corresponding to the number of chunks included in a file (or a divided file).

According to an embodiment of the present disclosure, the VFS layer 143 may generate a file storing command to the file system layers 145-1 and 145-2 according to a command of the distribution file control layer 141.

The file system layer 145 may access a specific memory according to rules necessary for reading and writing data from and to a memory. The file system layers 145-1 and/or 145-2 may directly perform a read or write operation on a memory according to a predetermined rule. When the VFS layer 143 generates a file storing command to the file system layers 145-1 and 145-2, each of the file system layers 145-1 and 145-2 may perform a read or write operation by accessing a memory through the block layer 147. According to an embodiment of the present disclosure, the first memory 120 and the second memory 130 may have different file system layers. For example, the first memory 120 may have a first file system layer 145-1 and the second memory 130 may have a second file system layer 145-2.

Figure 4:
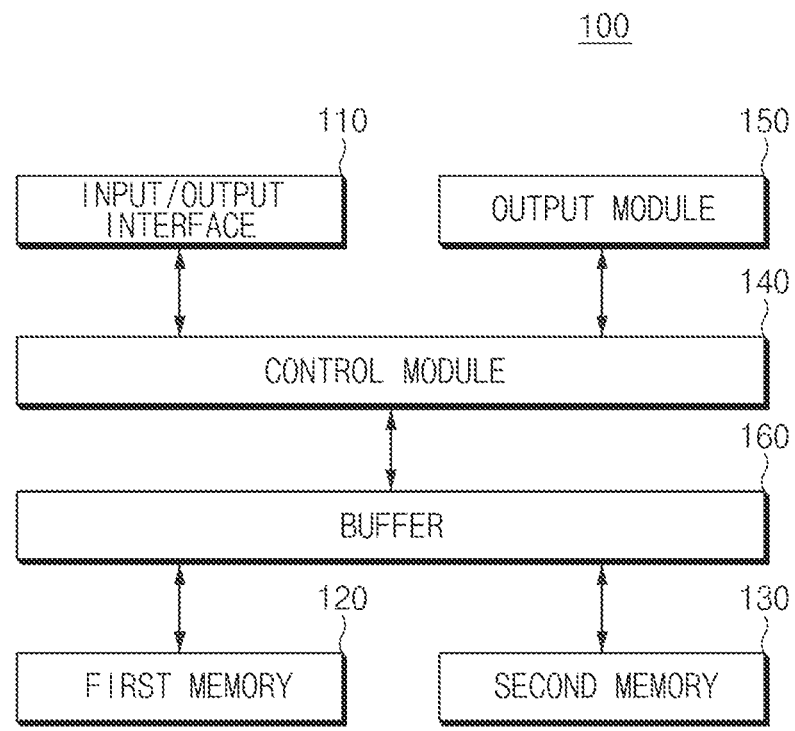
FIG. 4 is a block diagram illustrating a configuration of an electronic device according to an embodiment of the present disclosure.

FIG. 4 is a block diagram illustrating a configuration of an electronic device according to an embodiment of the present disclosure.

Referring to FIG. 4, an electronic device 100 is illustrated, where the electronic device 100 may include an output module 150 and/or a buffer 160 in addition to an input/output interface 110, a first memory 120, a second memory 130, and a control module 140.

The output module 150 may output a file stored in a memory. For example, the output module 150 may be implemented with an output device such as a display or a speaker to output an image or sound. According to an embodiment of the present disclosure, when a file distributed and stored by the control module 140 is integrated, the output module 150 may output the integrated file.

The buffer 160 may temporarily store a file divided by the control module 140. For example, the control module 140 may divide a file, which is inputted sequentially to the input/output interface 110, by a chunk unit and then store the divided file in the buffer 160. The buffer 160 may output a file, which is stored according to a control of the control module 150, to the first memory 120 or the second memory 130. According to an embodiment of the present disclosure, the buffer 160 may be implemented with a plurality of buffers (for example, three).

Although it is described that the electronic device shown in FIGS. 1 to 4 includes two memories 120 and 130, this is just one embodiment and an electronic device according to various embodiments of the present disclosure may include a plurality of memories (for example, at least three) and may distribute and store an inputted file in the plurality of memories.

Figure 5:
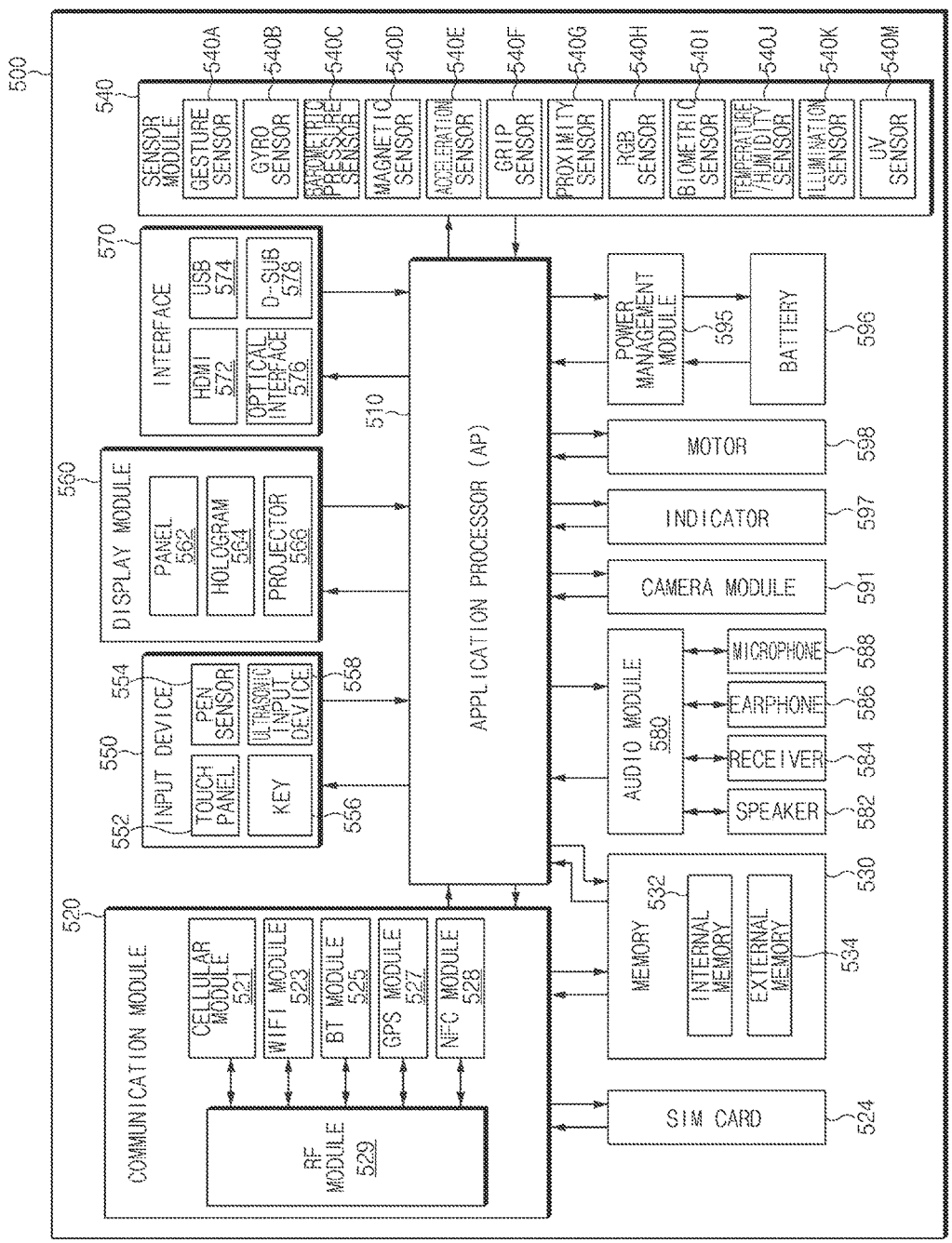
FIG. 5 is a block diagram of an electronic device according to an embodiment of the present disclosure.

FIG. 5 is a block diagram of an electronic device according to an embodiment of the present disclosure.

Referring to FIG. 5, an electronic device 500 is illustrated, where for example, the electronic device 500 may be all or part of the above-mentioned electronic device 100 shown in FIG. 1.

Furthermore, referring to FIG. 5, the electronic device 500 may include application processor (AP) 510, a communication module 520, a subscriber identification module (SIM) card 524, a memory 530, a sensor module 540, an input device 550, a display module 560, an interface 570, an audio module 580, a camera module 591, a power management module 595, a battery 596, an indicator 597, and a motor 598.

The AP 510 (for example, the control module 140, as illustrated in FIG. 1) may control a plurality of hardware or software components connected to the AP 510 and also may perform various data processing and operations with multimedia data by executing an operating system or an application program. The AP 510 may be implemented with a system on chip (SoC), for example. According to an embodiment of the present disclosure, the AP 510 may further include a graphic processing unit (GPU) (not shown).

The communication module 520 may perform data transmission/reception between the electronic device 500 (for example, the electronic device 100) and other electronic devices connected via network. According to an embodiment of the present disclosure, the communication module 520 may include a cellular module 521, a WiFi module 523, a BT module 525, a GPS module 527, an NFC module 528, and an RF module 529.

The cellular module 521 may provide voice calls, video calls, text services, or internet services through a communication network (for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). Additionally, the cellular module 521 may perform a distinction and authentication operation on an electronic device in a communication network by using a SIM (for example, the SIM card 524), for example. According to an embodiment of the present disclosure, the cellular module 521 may perform at least part of a function that the AP 510 provides. For example, the cellular module 521 may perform at least part of a multimedia control function.

According to an embodiment of the present disclosure, the cellular module 521 may further include a communication processor (CP). Additionally, the cellular module 521 may be implemented with SoC, for example. As shown in FIG. 5, components such as the cellular module 521 (for example, a CP), the memory 530, or the power management module 595 are separated from the AP 510, but according to an embodiment of the present disclosure, the AP 510 may be implemented including some of the above-mentioned components (for example, the cellular module 521).

According to an embodiment of the present disclosure, the AP 510 or the cellular module 521 (for example, a CP) may load instructions or data, which are received from a nonvolatile memory or at least one of other components connected thereto, into a volatile memory and then may process them. Furthermore, the AP 510 or the cellular module 521 may store data received from or generated by at least one of other components in a nonvolatile memory.

Each of the WiFi module 523, the BT module 525, the GPS module 527, and the NFC module 528 may include a processor for processing data transmitted/received through a corresponding module. Although the cellular module 521, the WiFi module 523, the BT module 525, the GPS module 527, and the NFC module 528 are shown as separate blocks in FIG. 5, according to an embodiment of the present disclosure, some (for example, at least two) of the cellular module 521, the WiFi module 523, the BT module 525, the GPS module 527, and the NFC module 528 may be included in one integrated chip (IC) or an IC package. For example, at least some (for example, a CP corresponding to the cellular module 521 and a WiFi processor corresponding to the WiFi module 523) of processors respectively corresponding to the cellular module 525, the WiFi module 527, the BT module 528, the GPS module 521, and the NFC module 523 may be implemented with one SoC.

The RF module 529 may be responsible for data transmission/reception, for example, the transmission/reception of an RF signal. Although not shown in the drawings, the RF module 529 may include a transceiver, a power amp module (PAM), a frequency filter, or a low noise amplifier (LNA). Additionally, the RF module 529 may further include components for transmitting/receiving electromagnetic waves on a free space in a wireless communication, for example, conductors or conducting wires. Although the cellular module 521, the WiFi module 523, the BT module 525, the GPS module 527, and the NFC module 528 share one RF module 529 shown in FIG. 5, according to an embodiment of the present disclosure, at least one of the cellular module 521, the WiFi module 523, the BT module 525, the GPS module 527, and the NFC module 528 may perform the transmission/reception of an RF signal through an additional RF module.

The SIM card 524 may be a card including a SIM and may be inserted into a slot formed at a specific position of an electronic device. The SIM card 524 may include unique identification information (for example, an integrated circuit card identifier (ICCID)) or subscriber information (for example, an international mobile subscriber identity (IMSI)).

The memory 530 (for example, the first memory 120 or the second memory 130, as illustrated in FIG. 1) may include an internal memory 532 and/or an external memory 534. The internal memory 532 may include at least one of a volatile memory (for example, a dynamic random-access memory (DRAM), a static RAM (SRAM), and a synchronous dynamic RAM (SDRAM)) and a non-volatile memory (for example, a one time programmable read-only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

According to an embodiment of the present disclosure, the internal memory 532 may be a Solid State Drive (SSD). The external memory 534 may further include flash drive, for example, a compact flash (CF), a secure digital (SD), a micro Micro-SD, a Mini-SD, an extreme digital (xD), and/or a memory stick. The external memory 534 may be functionally connected to the electronic device 500 through various interfaces. According to an embodiment of the present disclosure, the electronic device 500 may further include a storage device (or a storage medium) such as a hard drive.

The sensor module 540 measures physical quantities or detects an operating state of the electronic device 500, thereby converting the measured or detected information into electrical signals. The sensor module 540 may include at least one of a gesture sensor 540A, a gyro sensor 540B, a barometric pressure sensor 540C, a magnetic sensor 540D, an acceleration sensor 540E, a grip sensor 540F, a proximity sensor 540G, a color sensor 540H (for example, a red, green, blue (RGB) sensor), a biometric sensor 540I, a temperature/humidity sensor 540J, an illumination sensor 540K, and an ultra violet (UV) sensor 540M. Additionally or alternatively, the sensor module 540 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), and/or a fingerprint sensor (not shown). The sensor module 540 may further include a control circuit for controlling at least one sensor therein.

The input device 550 may include a touch panel 552, a (digital) pen sensor 554, a key 556, and/or an ultrasonic input device 558. The touch panel 552 may recognize a touch input through at least one of capacitive, resistive, infrared, or ultrasonic methods, for example. Additionally, the touch panel 552 may further include a control circuit. In a case of the capacitive method, both direct touch and proximity recognition are possible. The touch panel 552 may further include a tactile layer. In this case, the touch panel 552 may provide a tactile response to a user.

The (digital) pen sensor 554 may be implemented through a method similar or identical to that of receiving a user's touch input or an additional sheet for recognition. The key 556 may include a physical button, an optical key, or a keypad, for example. The ultrasonic input device 558, as a device checking data by detecting sound waves through a microphone (for example, a microphone 588) in the electronic device 500, may provide wireless recognition through an input tool generating ultrasonic signals. According to an embodiment of the present disclosure, the electronic device 500 may receive a user input from an external device (for example, a computer or a server) connected thereto through the communication module 520.

The display 560 may include a panel 562, a hologram device 564, and/or a projector 566. The panel 562 may include a liquid-crystal display (LCD) or an active-matrix organic light-emitting diode (AM-OLED). The panel 562 may be implemented to be flexible, transparent, or wearable, for example. The panel 562 and the touch panel 552 may be configured with one module. The hologram 564 may show three-dimensional images in the air by using the interference of light. The projector 566 may display an image by projecting light on a screen. The screen, for example, may be placed inside or outside the electronic device 500. According to an embodiment of the present disclosure, the display 560 may further include a control circuit for controlling the panel 562, the hologram device 564, or the projector 566.

The interface 570 may include an HDMI 572, a USB 574, an optical interface 576, and/or a D-sub 578, for example. Additionally or alternatively, the interface 570 may include a mobile high-definition link (MHL) interface, a SD card/multi-media card (MMC) interface, and/or an infrared data association (IrDA) standard interface.

The audio module 580 may convert sound into electrical signals and convert electrical signals into sounds. The audio module 580 may process sound information inputted/outputted through a speaker 582, a receiver 584, an earphone 586, or the microphone 588.

The camera module 591, as a device for capturing a still image and a video, may include at least one image sensor (for example, a front sensor and/or a rear sensor), a lens (not shown), an image signal processor (ISP) (not shown), or a flash (not shown) (for example, an LED or a xenon lamp).

The power management module 595 may manage the power of the electronic device 500. Although not shown in the drawings, the power management module 595 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 596, or a voltage, current, or temperature of the battery 596 during charging. The battery 596 may store or generate electricity and may supply power to the electronic device 500 by using the stored or generated electricity. The battery 596, for example, may include a rechargeable battery or a solar battery.

The indicator 597 may display a specific state of the electronic device 500 or part thereof (for example, the AP 510), for example, a booting state, a message state, or a charging state. The motor 598 may convert electrical signals into mechanical vibration. Although not shown in the drawings, the electronic device 500 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device 500, for example, according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

An electronic device according to various embodiments of the present disclosure may include a first memory, a second memory, and a control module, when a file storing event occur, for dividing a file inputted from the outside into a plurality of files thereby storing some of the divided files in the first memory and storing some of the remaining divided files in the second memory and the first memory or the second memory may include a header that indicates the storage location of the divided file.

Figure 6:
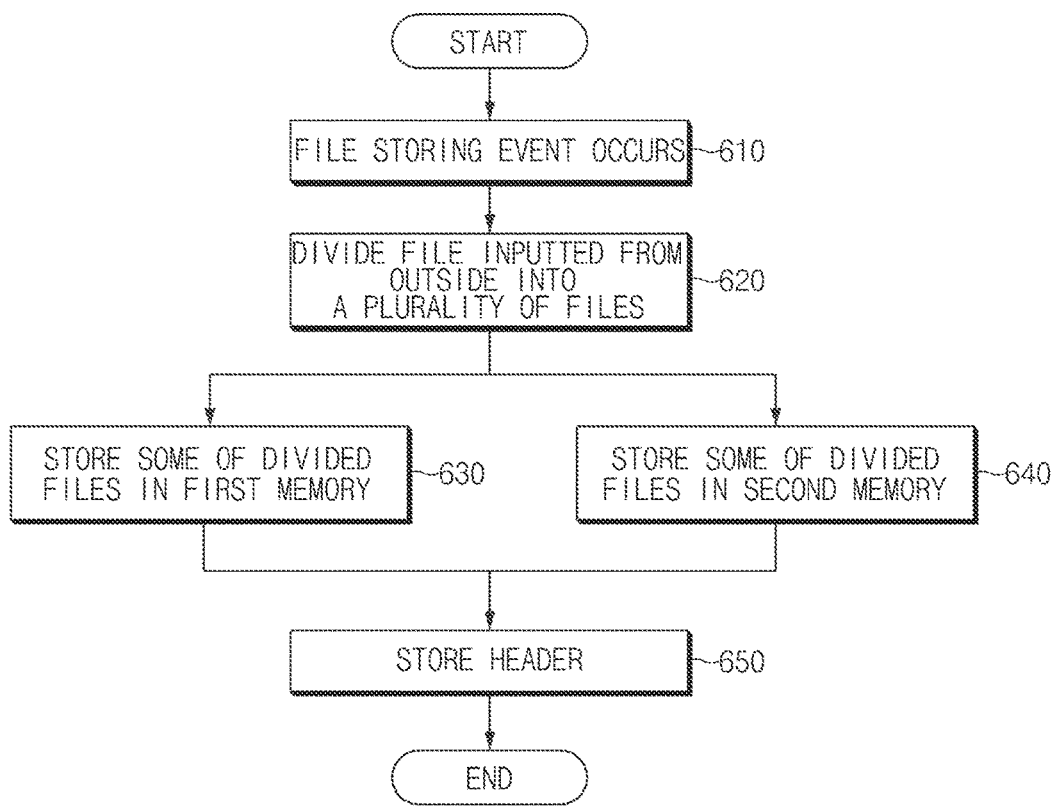
FIG. 6 is a flowchart illustrating a file storing method of an electronic device according to an embodiment of the present disclosure.

FIG. 6 is a flowchart illustrating a file storing method of an electronic device according to an embodiment of the present disclosure.

Referring to FIG. 6, a file storing method is illustrated, such that when a file saving event occurs in operation 610, the electronic device 100, as illustrated in FIG. 1, may divide a file inputted from the outside into a plurality of files in operation 620. According to an embodiment of the present disclosure, the size of a file stored in a first memory or a second memory may be determined according to an additional (or, separate) read or write operation (or, an I/O situation) currently performed on the first memory and the second memory. For example, when an additional read or write operation being performed in the second memory is more compared to the first memory, the size of a file stored in the first memory may be greater than the size of a file stored in the second memory.

In operation 630, the electronic device 100 may store some of the divided files in the first memory. In operation 640, the electronic device 100 may store some of the remaining divided files in the second memory. According to an embodiment of the present disclosure, when the electronic device 100 stores the divided files in a memory, it may store them by a chunk (or block) unit. The chunk is a unit for managing data in the electronic device 100 or the memory and may have a random size. According to various embodiments of the present disclosure, the electronic device 100 may perform operation 630 and operation 640 at the same time. For example, the electronic device 100 may generate a file storing command on the first memory and the second memory at the same time.

According to an embodiment of the present disclosure, the first memory or the second memory may be implemented in a form of being built in the electronic device 100. According to an embodiment of the present disclosure, the first memory or the second memory may be implemented in a form of being detachable from the electronic device 100. For example, the first memory may be a built-in memory and the second memory may be a detachable external memory. According to an embodiment of the present disclosure, the first memory or the second memory may be implemented in a UFS card (for example, a built-in type) or a UFS card (for example, an external type).

According to an embodiment of the present disclosure, the first memory and the second memory may have different file systems.

In operation 650, the electronic device 100 may store a header indicating the storage location of a divided file. According to an embodiment of the present disclosure, the header may include information regarding a memory that stores a divided file (for example, the first memory or the second memory), information (for example, the start location or the last location of a chunk) regarding a location that a chunk corresponds in an entire file, and information regarding the size of a chunk.

According to an embodiment of the present disclosure, the electronic device 100 may store the header in the data area among the data area and the metadata of the memory. According to an embodiment of the present disclosure, the electronic device 100 may store the header in at least one of the first memory and the second memory. For example, the electronic device 100 may store the header only in the first memory or store the header in both the first memory and the second memory.

According to an embodiment of the present disclosure, the electronic device 100 may insert a flag into metadata, such that the flag indicates that a file is distributed and stored in a plurality of memories.

Figure 7:
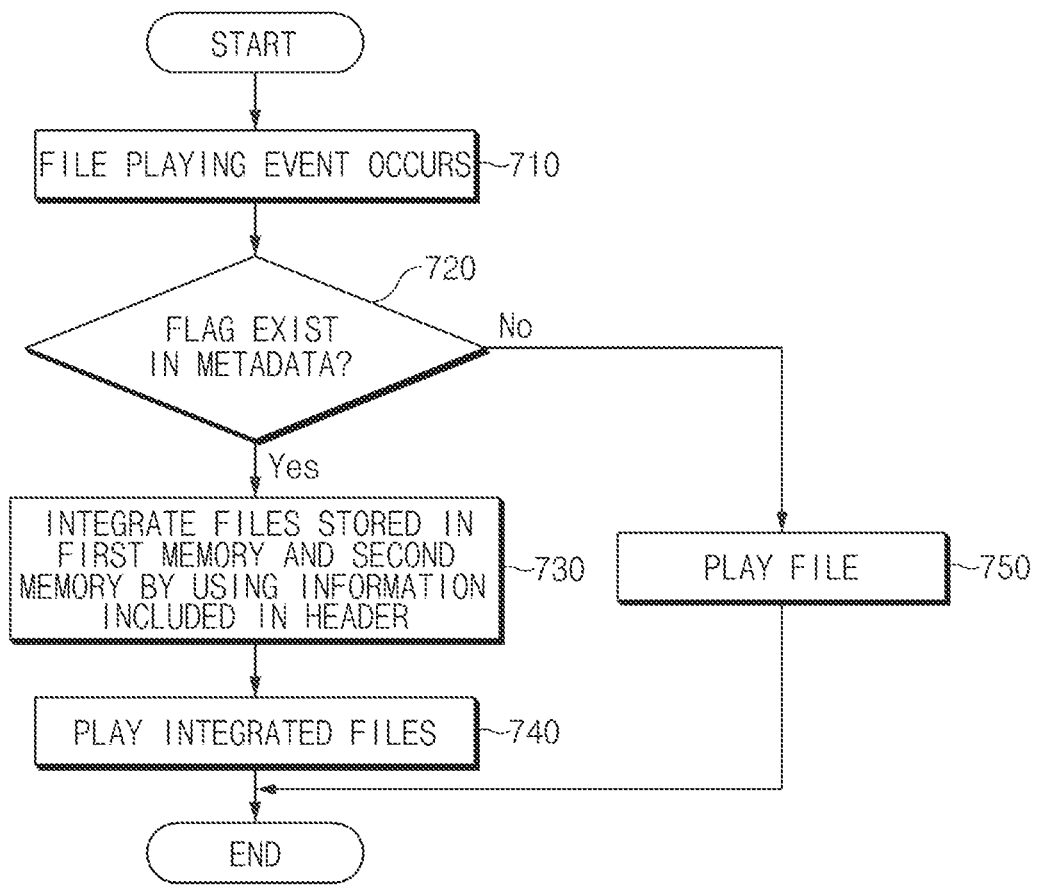
FIG. 7 is a flowchart illustrating a file playing method of an electronic device according to an embodiment of the present disclosure.

FIG. 7 is a flowchart illustrating a file playing method of an electronic device according to an embodiment of the present disclosure.

The file playing method of the electronic device shown in FIG. 7 may be performed after a file is stored according to the file storing method shown in FIG. 6.

Referring to FIG. 7, a file playing method is illustrated, such that when a file playing event (for example, a user's file playing instruction) occurs in operation 710, an electronic device 100, as illustrated in FIG. 1, may check whether there is a flag in metadata in operation 720.

If there is the flag in the metadata in operation 720, files stored in a first memory and a second memory may be integrated by using information included in a header in operation 730. For example, if there is a flag in metadata, the storage location of a divided file may be checked by checking the header of a corresponding file. When the storage location of a distribution file is checked, the electronic device 100 may read each file from a plurality of memories storing files and may integrate corresponding files by using information included in the header.

In operation 740, the electronic device 100 may play the integrated file. For example, the electronic device 100 may play the integrated file through a file playing application.

If there is no flag in the metadata in operation 720, a file may be played according to an existing method in operation 750. For example, a file stored in one memory may be played by a read operation.

According to various embodiments of the present disclosure, a method of file storing by an electronic device may include, when a file storing event occurs, dividing a file inputted from outside the electronic device into a plurality of files, storing a portion of the divided files in a first memory, storing another portion of the remaining divided files in a second memory, and storing in one of the first memory and the second memory a header that indicates the storage locations of the divided files.

According to various embodiments of the present disclosure, a file storing speed can be improved by storing one file in a plurality of storage devices simultaneously. Additionally, it is possible to gain a competitive edge by allowing a user to feel the improved speed for the same size of a file.

The method of file storing or the method of file playing according to the above-mentioned various embodiments of the present disclosure may be implemented with a program executable on the electronic device. Then, such a program may be stored in various types of recording media and used.

In more detail, program code for performing the above method may be stored in various types of nonvolatile recording media such as flash memory, ROM, EPROM, EEPROM, hard disk, removable disk, memory card, USB memory, and compact disc ROM (CD-ROM).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a first memory;
a second memory; and
at least one processor configured to:
receive a file storing event comprising a file for storing,
determine a current activity of the first memory and the second memory,
divide the file into a first plurality of files according to a first unit file size and a second plurality of files according to a second unit file size, wherein the first unit file size and the second unit file size are determined based on the current activity of the first memory and the second memory,
store the first plurality of files in the first memory, and store the second plurality of files in the second memory,
wherein one of the first memory and the second memory comprises a header notifying a storage location of the plurality of files, and
wherein the current activity of the first memory and the second memory comprises at least one of a read operation or a write operation currently performed on the first memory and the second memory.

2. The electronic device of claim 1, wherein the at least one processor is further configured to:
generate a first file storing command for storing the first plurality of files in the first memory;
generate a second file storing command for storing the second plurality of files in the second memory; and
execute the first file storing command and the second file storing command at a same time.

3. The electronic device of claim 1,
wherein the first plurality of files and the second plurality of files are stored by a chunk unit, and
wherein the header comprises information regarding a memory where the chunk unit is stored, information regarding a location that the chunk unit corresponds to in an entire file, and information regarding a size of the chunk unit.

4. The electronic device of claim 1,
wherein the first memory and the second memory comprise:
a data area where data is stored; and
a metadata area comprising information regarding the stored data, and
wherein the header is stored in the data area.

5. The electronic device of claim 1,
wherein the first memory and the second memory comprise:
a data area where data is stored; and
a metadata area comprising information regarding the stored data, and
wherein the metadata area comprises a flag indicating that a stored file is distributed in a plurality of memories.

6. The electronic device of claim 1, wherein the first memory and the second memory have different file systems.

7. The electronic device of claim 1,
wherein the first memory is built in the electronic device, and
wherein the second memory is detachable from the electronic device.

8. The electronic device of claim 7, wherein the second memory is a universal flash storage (UFS) card.

9. The electronic device of claim 1, further comprising at least one buffer configured to:
store the first plurality of files and the second plurality of files by a chunk unit; and
output the first plurality of files to the first memory and the second plurality of files to the second memory.

10. The electronic device of claim 1, wherein the at least one processor is further configured to:
receive a playback command to playback the file;
integrate the first plurality of files and the second plurality of files into the file by using information included in the header; and
playback the file.

11. A method of file storing by an electronic device, the method comprising:
receiving, by at least one processor of the electronic device, a file storing event comprising a file for storing;
determining, by the at least one processor, a current activity of a first memory of the electronic device and a second memory of the electronic device;
dividing, by the at least one processor, the file into a first plurality of files according to a first unit file size and a second plurality of files according to a second unit file size, wherein the first unit file size and the second unit file size are determined based on the current activity of the first memory and the second memory;
storing the first plurality of files in the first memory;
storing the second plurality of files in the second memory; and
storing a header indicating a storage location of the plurality of files in one of the first memory and the second memory, wherein the current activity of the first memory and the second memory comprises at least one of a read operation or a write operation currently performed on the first memory and the second memory.

12. The method of claim 11, wherein the storing of the first plurality of files in the first memory and the storing of the second plurality of files in the second memory are performed at a same time.

13. The method of claim 11,
wherein the first plurality of files and the second plurality of files are stored by a chunk unit, and
wherein the header comprises information regarding a memory where the chunk unit is stored, information regarding a location that the chunk unit corresponds to in an entire file, and information regarding a size of the chunk unit.

14. The method of claim 11, wherein the storing of the header in the one of the first memory and the second memory comprises storing the header in a data area where data is stored and a metadata area comprising information regarding the stored data.

15. The method of claim 11, further comprising, inserting a flag indicating that the file is distributed and stored in a plurality of memories into a first metadata area among a data area where data is stored and a second metadata area comprising information regarding stored data.

16. The method of claim 11, further comprising:
storing the first plurality of files and the second plurality of files in at least one buffer by a chunk unit; and
outputting the first plurality of files to the first memory and the second plurality of files to the second memory.

17. The method of claim 11, further comprising:
receiving a playback command to playback the file;
checking whether there is a flag indicating that the file is distributed and stored in metadata;
integrating the first plurality of files and the second plurality of files into the file by using information included in the header, when there is the flag; and
playing the file.

18. A non-transitory computer-readable storage medium storing instructions that, when executed, cause at least one processor to perform the method of claim 11.

* * * * *